Sept. 15, 1970  H. G. ROGERS  3,528,723
LIGHT POLARIZING DEVICE
Filed Aug. 30, 1967  2 Sheets-Sheet 1

INVENTOR.
Howard G. Rogers
BY
Brown and Mikulka
and
Leonard S. Selman
ATTORNEYS

Sept. 15, 1970      H. G. ROGERS      3,528,723

LIGHT POLARIZING DEVICE

Filed Aug. 30, 1967      2 Sheets-Sheet 2

INVENTOR.
Howard G. Rogers

BY Brown and Mikulka
and
Leonard S. Selman
ATTORNEYS

United States Patent Office 3,528,723
Patented Sept. 15, 1970

3,528,723
LIGHT POLARIZING DEVICE
Howard G. Rogers, Weston, Mass., assignor to Polaroid Corporation, Cambridge, Mass., a corporation of Delaware
Filed Aug. 30, 1967, Ser. No. 664,411
Int. Cl. G02b 5/30
U.S. Cl. 350—157                    10 Claims

ABSTRACT OF THE DISCLOSURE

This disclosure relates generally to light polarizing devices and systems of high efficiency which transmit a very large portion of incident light and in particular to such devices which are simple in structure and thus adapted to production methods of manufacture on an economical basis.

BACKGROUND AND SUMMARY OF THE INVENTION

The light polarizing devices of the present invention are related to those described in U.S. Pat. No. 3,213,753, now U.S. Reissue Pat. No. 26,506, and assigned to the same assignee. This invention employs a plurality of layers of an oriented birefringent material, such as polyethylene terephthalate. The layers have lenticulations or other configurations formed in at least one surface thereof running the length of the sheets. Two of these lenticulated layers are assembled together with an isotropic layer between them having an index of refraction which matches the lower index of both the lenticulated sheets. In prior embodiments, the optic axis of the birefringent material has been oriented to extend in one birefringent sheet in the length direction or dimension of the lenticulations and in the other sheet 90 degrees to the length direction. The lenticulations are offset laterally from one another by a distance equal to half the width of one lenticulation. The structure divides unpolarized light passing therethrough into two sets of intercalated or interdigitated, oppositely polarized components.

It has been proposed to provide retardation strips on the exit surface of the above-described multi-layer polarizer which act on one set of the oppositely polarized components in a manner to convert those components to the same form those components which are not acted upon by said retardation strips. The resulting beam is then uniformly polarized. In past embodiments, the retardation elements to accomplish this purpose have been cut as strips from a birefringent sheet having a 45° molecular orientation with respect to the longitudinal edges thereof. The requirement of cutting the strips so that the stretch or optic axis is oriented at a 45° angle to the length of the strips slows down the manufacturing process of this type of polarizer and makes difficult the use of a continuous process. This invention, however, allows the use of retardation strips that have a stretch direction parallel with the length of the strips, thus wide strip material may be stretched in the direction of travel of the strip and cut as it comes directly off a roll by a plurality of spaced blades in planes oriented perpendicular to the roller axis and the continuous narrow strips spaced apart and laid directly on the sheet polarizing material. In order to make this possible and still retain the desired total polarization capability of the multi-layered polarizer, it is within the contemplation of the present invention to orient the optic axes of the oriented birefringent layers at an angle, preferably of 45°, relative to the length of the lenticulations formed therein. This orientation is achieved during a stretching operation and pressing of the lenticulations in the birefringent layers prior to combination of the layers and does not affect the continuous processing whereby the several layers are formed into an integral total polarizer. An important advantage of the present invention resides in the fact that certain highly desirable optical properties of the constituent materials in the total polarizer may be preserved. Specifically, it has been noted that certain birefringent materials, when lenticulated by a pressing or similar deforming operation, may lose a proportion of their birefringent properties in the process of lenticulation. This possible loss of birefringence is more likely when the lenticulations extend transverse to the stretch axis of the material. Thus, an oriented birefringent material, when lenticulated in a direction parallel to the stretch axis, may suffer little or no degradation of its optical properties, while a similar sheet of material, lenticulated with a series of longitudinal surface lens elements extending at 90° to the stretch axis, may lose a very substantial portion of its birefringent properties in the immediate vicinity of the lenticulations. It has been found, however, that when some such birefringent materials such as the aforementioned polyethylene terephthalate have a series of lenticulations impressed upon their surface at an angle of 45° to the stretch axis, very little change in the optical properties of the material results.

The light polarizing devices of the present invention, because of their improved transmission properties and high degree of polarization, are contemplated for use in anti-glare headlamp systems for vehicles as well as monoscopic and stereoscopic projection systems, etc.

Accordingly, an object of the present invention is to provide a novel and improved light polarizing device of high efficiency and wide utility which converts a large percentage of the incident light to polarized light and transmits it with substantially unreduced intensity.

Another object is to provide a light polarizer of the character described which includes a combination of birefringent lenticular, isotropic and retardation elements which is simple in structure and capable of continuous manufacture on an economical basis.

Other objects of the invention will in part be obvious and will in part appear hereinafter.

The invention accordingly comprises the article possessing the features, properties and the relation of components which are exemplified in the following detailed disclosure and the scope of the application of which will be indicated in the claims.

DESCRIPTION OF THE PREFERRED AND AN ALTERNATE EMBODIMENT

As hereinbefore intimated, the present invention is primarily concerned with the end problem of providing, in practical and efficient form, what may be termed a high-transmission light polarizer, namely one which is particularly adapted to polarize a very large portion of incident light for use primarily in a polarizing headlamp and viewing-visor system for automobiles. Other possible uses may include projection or other illumination purposes. Thus, for example, although no limited to use therewith, collimated light beams may be provided by supplementary means such as the headlight shown in FIG. 4 herein and converted to polarized rays of substantially undiminished intensity. Any loss of light is essentially limited to a relatively minor amount occurring at the abutting or tangential edges of elongated lenticular elements of the polarizing device. The transmitted polarized light may be in the form of either collimated or non-collimated rays as desired, depending upon structural characteristics of the sheet material, to be described. Again, the transmitted rays may be either linearly polarized and vibrating in a single given azimuth, or vibrating in predetermined different directions. When used with a properly-oriented quarter-wave plate (not shown), located in a conventional manner at an exit surface, the emergent rays may be circularly polarized. With these general considerations in mind, the specific structures of the invention will now be described in detail.

Figure 1:
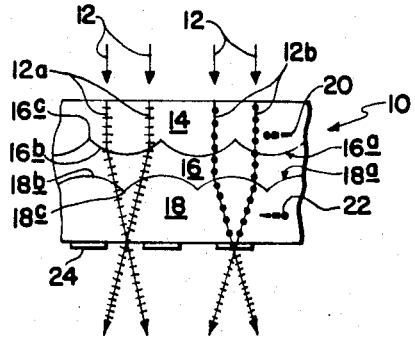
FIG. 1 is a diagrammatic, fragmentary, edge view of a light polarizing material or device of the present invention illustrating the transmission of light rays therethrough.
Figure 2:
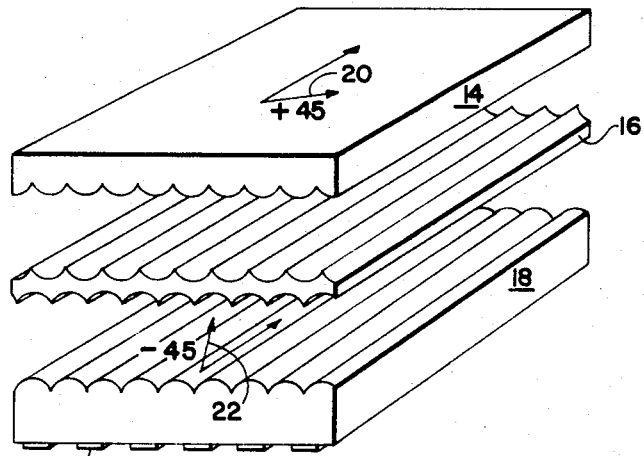
FIG. 2 is an exploded, perspective view of a light polarizing device of the present invention illustrating the optic axes of the birefringent layers thereof.

In FIG. 1 there is shown, in considerably exaggerated dimensions, a fragment of a light polarizing sheet material 10 as it would appear in elevation, namely, as viewed along a given edge. In order of arrangement with respect to the direction of a collimated beam 12 from a light source (not shown) the material is composed of a birefringent layer 14, an isotropic or at least functionally isotropic layer 16 having a relatively low index of refraction, and a second birefringent layer 18 identical to layer 14, the layers preferably being laminated or bonded together to form a unitary structure. It is not essential to operability to have the layers thus bonded, however, provided that the facing layer-surfaces enclosing an air layer are in parallel relation. The lower index of refraction of both birefringent layers 14 and 18 substantially matches the refractive index of isotropic layer 16. For purposes of illustration, the two indices of refraction of each birefringent layer may be taken as approximately 1.55 and 1.70 and the index of each isotropic layer as approximately 1.55. The layers 14 and 18 have optic axes 20 and 22, respectively, disposed parallel to the plane of the sheet material 10 and in a direction displaced +45 and −45 degrees to the surfaces of the paper as shown in FIG. 2.

The interface 16a between layers 14 and 16 and the interferface 18a between layers 16 and 18, are composed of a plurality of elongated, lens-like or lenticular elements 16b and 18b, respectively. The lenticules 16b and 18b extend across the entire area of the material in a direction normal to the surface of the paper, each pair thus being joined along a line 16c or 18c extending in a similar direction, the joining lines being parallel. The lenticules 16b and 18b are to be understood as actually of a size permitting a side-by-side arrangement of as many as several hundred to the inch. Their chosen size, spherical or aspherical curvature, relative disposition and positive or negative form are dependent upon considerations relating to the required paths and focusing of light-ray components. As shown, the curvature of the lenticules of interfaces 16a and 18a is relatively similar. The lenticules of the two interfaces are offset with respect to one another, the vertices of the lenticules of one interface being optically aligned with the longitudinal interconnecting edges of those of the other interface.

In order to treat the rays to be polarized by polarizer 10 to provide their vibrations in a single azimuth, a plurality of elongated half-wave retardation strips 24 are shown as bonded to the exit face of the polarizer so as to extend in a direction parallel to the lenticulations thereof. As stated previously, because of the 45° orientation of the optic or stretch axes 20 and 22 to lenticulations 16b and 18b, the optic or stretch axis of strips 24 may run in their length direction simplifying the structure and allowing the strips to be cut, spaced and bonded directly to layer 18 during a relatively high speed production process.

A certain degree of latitude is possible as to the choice of materials employed in forming the several layers. Thus, for example, layers 16 and 18 may suitably be composed of an isotropic plastic material as, for example, a methacrylate such as cyclohexylmethacrylate, having a refractive index of 1.55. Layer 16 may, appropriately, be composed of a plastic material as, for instance, of polyethylene terephthalate which has been rendered birefringent. A readily obtainable material of this composition, having refractive indices of 1.55 and 1.70 when thus rendered birefringent is one having the trade name "Mylar," commercially available from E. I. du Pont de Nemours Co., Wilmington, Del., U.S.A.

One method of constructing the polarizing device 10 is to preform the birefringent elements 14 and 18, applying the isotropic layer 16 as a coating on one birefringent layer, such as a so-called "hot-melt," and placing the other birefringent layer against the coated layers applying such compression as may be necessary to cause the outer surfaces of the latter layers to conform to the lenticulated surfaces 16b and 20b and adhere thereto at the interfaces 16a and 18a.

A process for forming the layers 14 and 18 to provide both the birefringence and lenticulated surfaces essential thereto includes the steps of stretching, for example, in the presence of heat or other softening agent, a sheet, of adequate thickness, of the aforementioned polyethylene terephthalate in the illustrated direction of the optic axes 20 and 22, while applying, compressively, a die having fluted configurations of the intended shape and size to a surface of the sheet. This surface is, of course, softened to a degree to render it adequately deformable. Assuming the stated indices of refraction, a birefringence of .2 may thus be established as a property of layers 14 and 18. A substance such as a silicone may, advantageously, be precoated on the die to serve as a lubricant and prevent its adhesion to the softened surface of the sheet. Another method contemplates the extrusion of the softened methacrylate from an orifice having a given fluted surface and a plane surface. The axial orientation and surface configuration are provided substantially simultaneously by the foregoing methods. Other possible processes involve a sequential performance of embossing and orientation steps. As described, it will be noted that the lenticules 16b and 18b are generally cylindrical and that the optic axes 20 and 22 are disposed in orthogonal relation, a preferred although not unalterable condition. It is to be understood that appropriate subcoats may be applied to the respective components to facilitate bonding, where advisable.

The collimated beams 12 shown in FIG. 1, emanating, for example, from a light source and reflector (not shown), and normally incident upon the doubly-refracting layer 14, are resolved thereby into two components, shown as separate rays, namely, an extraordinary or E ray 12a having, for example, the higher index 1.70 and an ordinary or O ray 12b having, for example, the lower index 1.55, the rays traveling in a similar direction but at different speeds and with their vibration azimuths relatively orthogonally disposed. The higher index rays 12a are convergently refracted at the interface 16a, it being recalled that the refractive index of isotropic layer 16 was given at 1.55. The rays 12b are undeviated at the interface 16a because their refractive index matches that of layer 16. Ray components 12a and 12b pass through isotropic layer 16 without deviation but component 12b is refracted at the interface 18a due to the relation of their assumed vibration directions to the optic axis 22. The orthogonally polarized ray components are focused at a focal plane adjacent to the exit face of the composite assembly. As described, the layers 14 and 18 are positively birefringent inasmuch as the refractive index of the E ray is represented as higher than that of the O ray, but a reverse condition is possible.

Figure 3:
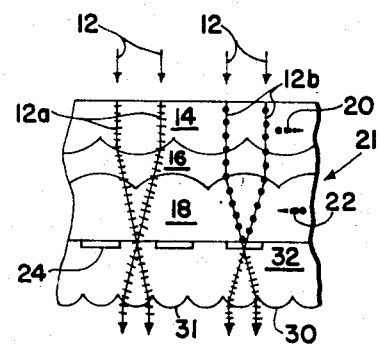
FIG. 3 is a diagrammatic, fragmentary, edge view of a modification of the light polarizing material of the invention.

Either the E or the O ray, or both, may be selectively treated, as by passing them through the retardation strips 24 to provide their vibrations in a single azimuth as shown in FIG. 1. The strips 24 are so relatively spaced that ray components deviated at but one of the interfaces 16a and 18a pass therethrough, it being apparent that rays focused by either lenticulated interface may be chosen for interception by the retardation strips and rotation of their polarizing direction for the purpose of polarizing conformation. Alternatively, the retardation strips 24 may be supplanted by quarter-wave-retardation strips positioned similarly to the strips 24 and, additionally, in the spaces therebetween so as to intercept all of the emergent rays.

Wherein it is required to provide collimated emergent ray components, means for the purpose is illustrated in the device 21 of FIG. 3 in the form of a convergently lenticulated exit surface 30 of an isotropic layer 32. In a modification of this concept it would also be possible to provide a lenticular surface directly on the layer 18 employing either positively- or negatively-refracting elements for the purpose.

Figure 4:
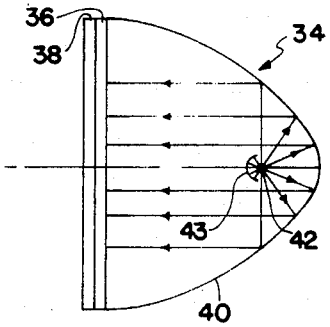
FIG. 4 is a diagrammatic side view of a headlamp of an automotive vehicle incorporating one of the light polarizing sheet materials of FIGS. 1, 3 or 6.

FIG. 4 illustrates incorporation of the high transmission light polarizers of the present invention in a lamp assembly such as the headlamp of an automotive vehicle. FIG. 4 represents, diagrammatically, a headlamp 34 including a sheet polarizer 36 which may be any of the types shown in FIGS. 1, 3 or 6, a protective glass face plate 38, a parabolic mirror 40, a filament 42 and a specularly reflecting curved plate 43. As shown, the mirror is so contoured as to produce collimation of the light beams reflected toward and incident upon the polarizing sheet 36 at approximately 90°, the plate 43, located at the focus of filament 42, serving both to reflect beams toward mirror 40, where they are collimated, and to shield the sheet 36 from diffused rays from the filament.

Figure 5:
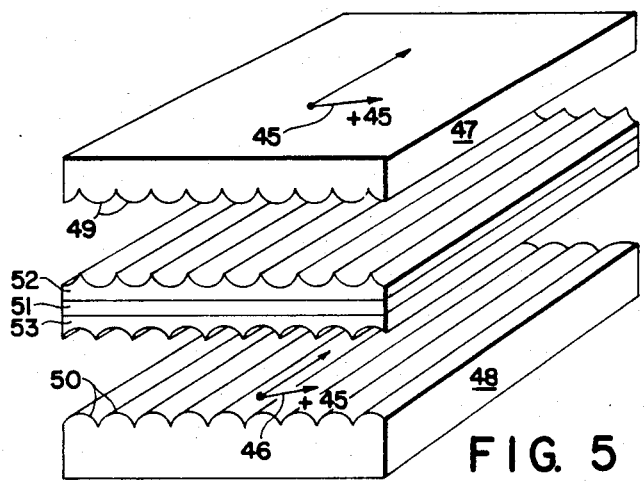
FIG. 5 is an exploded, perspective view of an alternate embodiment of a light polarizing device of the invention illustrating the optic axes of the birefringent layers thereof.
Figure 6:
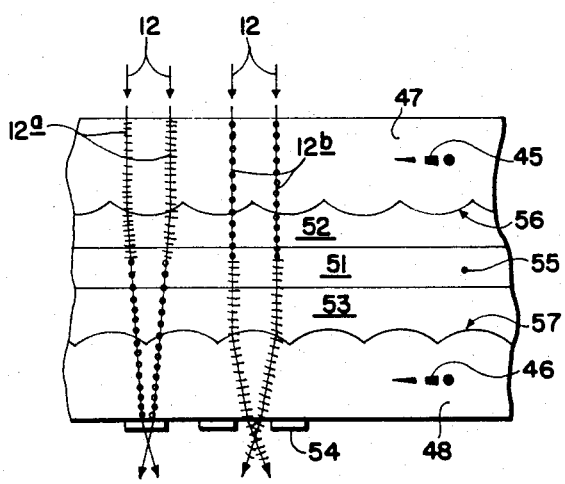
FIG. 6 is a diagrammatic, fragmentary, edge view of the polarizing device of FIG. 5.

FIGS. 5 and 6 show an alternative embodiment of the invention wherein the optic axes 45 and 46 of birefringent layers 47 and 48 are each oriented at 45° to the length direction of lenticulations 49 and 50 but instead of being in orthogonal relation to one another the two optic axes are in parallel relation, as shown in FIG. 5. This is achieved by the use of half-wave retardation layer 51 between a pair of isotropic layers 52 and 53. Retardation strips 54 are provided on the outside surface of layer 48 and may have an optic axis extending in the direction of their elongated dimension with the aforementioned advantages occurring thereto. The optic axis 55 of the half-wave plate is disposed substantially at 45° to the optic axes of the birefringent sheets 47 and 48. As an example, the birefringent sheets or layers may have a pair of refractive indices of 1.55 and 1.70 and the refractive index of each isotropic layer may be taken as 1.55.

A collimated beam 12 incident upon birefringent layer 14 is resolved thereby into two components shown as separate rays, namely an extraordinary or E ray 12a having, the higher index 1.70 and an ordinary or O ray 12b having, for example, the lower index 1.55, the rays travelling in a similar direction but at different speeds and with their vibration azimuths relativley orthogonally disposed. The higher index rays 12a are convergently refracted at the interface 56, it being recalled that the refractive index of isotropic layer 52 was given at 1.55. The rays 12b are undeviated at the interface 56 because their refractive index matches that of layer 52. The vibration directions or azimuths of both rays 12a and 12b are rotated or reversed during their transmittal by the half-wave retardation layer 51. Ray components 12a pass through isotropic layer 53 without deviation and straight through birefringent layer 48 by reason of their converted or assumed vibration direction to the optic axis 46. Ray components 12b also pass through isotropic layer 53 without deviation but are refracted at the interface 57 due to the relation of their assumed vibration directions to the axis 46. The orthogonally polarized ray components are focused in intercalated relationship at a focal plane adjacent to the exit face of the composite assembly. The retardation strips 54 are so spaced on the exit face so that the ray components deviated at but one of the interfaces 56 and 57 pass therethrough and are thereby rotated to conform to the polarization direction of the other components for the purpose of polarizing conformation.

Consistent with obtaining an operational refraction or non-refraction of rays generally similar to those illustrated, the several layers may be formed of substantially any materials having suitable refractive indices, transparency and physical or mechanical properties such as thermal stability, flexibility or adhesion. Thus, for example, the isotropic layer 16 may be composed of any of such materials as vinyl acetate, cellulose acetate butyrate, polyvinyl carbazole, a polystyrene, an acrylic, glass, etc. Layers 14 and 18 may be a sodium nitrate crystal plate having indices of refraction of 1.587 and 1.336 or a calcite crystal plate having indices of 1.658 and 1.486.

It is possible to use an isotropic interlayer the index of refraction of which does not necessarily match the lower index of the birefringent sheets. There can, in fact, be used a material whose refractive index lies below the lower index of the birefringent layer with satisfactory results.

Additionally materials which can conceivably be used in forming the shown birefringent layers comprise cellulose acetate, ethyl cellulose, and methyl cellulose. While a uniaxial type of birefringent layer is that principally conceived of and preferred, it is possible to employ a biaxial material for the purpose provided that the proper functional relation between the indices of refraction of the several layers is maintained. The indices of refraction of the several layers may further be controlled by predeterminedly altering their moisture or plasticizer content as, for example, the index may be lowered by adding moisture content and, in general, by adding plasticizer. Where bonding substances or subcoats are employed in laminating preformed layers, a material used for such a purpose should have an index of refraction similar to that of one of the layers undergoing bonding to prevent unwanted reflection.

While collimation of the incident beams 12 is not essential to operativeness, this condition is generally or predominantly to be expected in an anti-glare headlamp system and non-collimated diverging entering beams would require a lateral repositioning of the half-wave retardation strips 24 or of any collimating means at the exit surface such as the lenticular means 31 to accommodate to focal points which would differ laterally from those shown. Thus, the lateral locations of focal points and elements located thereat would depend upon whether they were adapted to function relative to collimated or diverging incident light. In the instance of a polarizer adapted to function with diverging incident rays, it may generally be assumed that the locations of element at the focal points are along theoretical lines from the light source which pass through the centers of the lenticules at a first interface.

The size, radius of curvature and focal length of lenticules, the indices of refraction of the respective layers, etc., are so chosen as to establish a focal plane adjacent to an exit face of each assembly. Where the lenticules have a large radius of curvature, it would be possible to reduce the overall thickness by making each in the form of a fresnel lens.

Further referring to general structural considerations, lenticules, where positive, may, for example, be of a spherical, cylindrical or elliptical form, depending upon the optical requirement, and the negative lenticules may be of any chosen fluted or concave contour which serves an intended function. Wherein birefringent layers have been described as positively birefringent, they may be negatively birefringent, assuming a modification of the refractive indices of E and O rays.

Since certain changes may be made in the above product without departing from the scope of the invention herein involved, it is intended that all matter contained in the above description or shown in the accompanying drawing shall be interpreted as illustrative and not in a limiting sense.

I claim:

1. A layer of birefringent material for inclusion in a multilayered light polarizing device, said layer having an optic axis extending in a given direction, and comprising selectively at least one configured surface, said selected configurations extending along the length of said surface and disposed at substantially a 45° angle to the optical axis of said birefringent layer.

2. A layer of birefringent material for inclusion in a multilayered light polarizing device, as defined in claim 1, wherein said configurations are cylindrical lenticules.

3. A multilayered light polarizing device for receiving unpolarized light and transmitting a large portion of said light in the form of polarized light rays comprising, at least a pair of layers of birefringent material, each of said birefringent layers having an optic axis extending in a given direction, said birefringent layers each having at least one selectively configured surface, said selected configurations extending the length of said surface and disposed at substantially a 45° angle to the respective optical axes of said birefringent layers said optic axes being orthogonal to each other.

4. A multilayered light polarizing device, as defined in claim 3, including a layer of isotropic material positioned intermediate said pair of birefringent layers.

5. A multilayered light polarizing device, as defined in claim 4, wherein said birefringent layers have the same refractive indices, said isotropic layer having a refractive index substantially identical to one refractive index of said birefringent layers.

6. A multilayered light polarizing device, as defined in claim 5, wherein retardation means are included adjacent to a surface thereof for selectively altering the polarization azimuth of at least a portion of the light transmitted by said device to provide emergent light from said device which has a single given polarization azimuth.

7. A multilayered light polarizing device as defined in claim 6, wherein said retardation means comprise a plurality of elongated predeterminedly laterally-spaced half-wave retardation strips having an optic axis parallel to the longitudinal edges of said retardation strips, said retardation strips being parallel to said configurations, said configurations in one of said birefringent layers being parallel to said configurations in another of said birefringent layers.

8. A multilayered light polarizing device, as defined in claim 7, wherein said configurations are cylindrical lenticules.

9. A composite multilayered light polarizing device adapted to transmit, in the form of polarized light, a relatively large portion of the essentially unpolarized light which is incident thereupon and including at least a pair of birefringent layers, each of said layers having an optic axis extending in a given direction, comprising, in order of transmittal of said incident light:

a first birefringent layer having, respectively, an entrance surface, given indices of refraction and an inwardly-facing lenticulated second surface, the lenticulations extending the length of said surface and disposed at substantially a 45° angle to the optic axis of said birefringent first layer;

an isotropic layer having, respectively, an index of refraction substantially identical to one index of said birefringent layer, a lenticulated first surface facing and conforming to that of said first birefringent layer to provide therewith a first lenticulated interface and an outwardly-facing lenticulated second surface;

a second birefringent layer having, respectively, indices of refraction identical to those of said first birefringent layer, a lenticulated first surface facing and conforming to the lenticulated second surface of said isotropic layer to provide therewith a second lenticulated interface, the lenticulations of said first surface extending the length of said surface and disposed at substantially a 45° angle to the optic axis of said second birefringent layer, and an exit surface, the optic axes of said first and second birefringent layers being in orthogonal relationship to one another, the lenticules of said first and second lenticulated interface being arranged in lateral offset relation such that the vertices of one interface is optically aligned with the adjoining lines of the other interface, the double-refractive property of said first birefringent layers resolving each entering beam into E and O ray components, one of which is convergently refracted at said first interface and focused in the vicinity of said exit surface and the other of which is convergently refracted at said second interface and also focused in the vicinity of said exit surface; and a plurality of retardation means adjacent to said exit surface for selectively altering the polarization azimuth of at least one of said ray components to provide emergent rays of a single given polarization azimuth, said retardation means comprising a plurality of predeterminedly laterally-spaced half-wave elongated retardation strips having an optic axis parallel to the longitudinal edges of said retardation strips.

10. A composite multilayered light polarizing device adapted to transmit, in the form of polarized light, a relatively large portion of the essentially unpolarized light which is incident thereupon and including at least a pair of birefringent layers, each of said layers having an optic axis extending in a given direction, comprising, in order of transmittal of said incident light:

a first birefringent layer having, respectively, an entrance surface, given indices of refraction and an inwardly-facing lenticulated second surface, the lenticulations extending the length of said surface and disposed at substantially a 45° angle to the optic axis of said birefringent first layer;

a first isotropic layer, having, respectively, an index of refraction substantially identical to one index of said birefringent layer, a lenticulated first surface facing and conforming to that of said first birefringent layer provide therewith a first lenticulated interface and an outwardly-facing planar second surface;

a half wave retardation layer having planar surfaces and an optic axis in the plane thereof disposed at an acute angle relative to said optic axis of the first birefringent layer;

a second isotropic layer, having, respectively, a planar first surface, an index of refraction identical to that of said first isotropic layer, and an outwardly-facing lenticulated second surface;

a second birefringent layer having, respectively, indices of refraction identical to those of said first birefringent layers, a lenticulated first surface facing and conforming to the lenticulated second surface of said isotropic layer to provide therewith a second lenticulated interface, the lenticulations of said first surface extending the length of said surfaces and disposed at substantially a 45° angle to the optic axis of said second birefringent layer, and an exit surface, the optic axes of said first and second birefringent layers being in parallel relationship to one another, the lenticules of said first and second lenticulated interface being arranged in lateral offset relation such that the vertices of one interface is optically aligned with the adjoining lines of the other interface, the double-refractive property of said first birefringent layers resolving each entering beam into E and O ray components, one of which is convergently refracted at said first interface and focused in the vicinity of said exit surface and the other of which is convergently refracted at said second interface and also focused in the vicinity of said exit surface, said ray components having orthogonally disposed azimuths of polarization which are relatively reversed in direction during transmittal by said half-wave retardation layer; and a plurality of retardation means adjacent to said exit surface for selectively altering the polarization azimuth of at least one of said ray components to provide emergent rays of a single given polarization azimuth, said retardation means comprising a plurality of predeterminedly laterally-spaced half-wave elongated retardation strips having an optic axis parallel to the longitudinal edges of said retardation strips.

References Cited

UNITED STATES PATENTS

| | | | |
|---|---|---|---|
| Re. 26,506 | 12/1968 | Rogers | 350—157 |
| 2,270,535 | 1/1942 | Land et al. | 350—157 X |
| 2,458,179 | 1/1949 | Land | 350—156 |
| 2,887,566 | 5/1959 | Marks | 350—157 |
| 2,977,845 | 4/1961 | Boone | 350—157 X |

DAVID SCHONBERG, Primary Examiner

P. R. MILLER, Assistant Examiner

U.S. Cl. X.R.

350—147, 152, 155, 167